UNITED STATES PATENT OFFICE.

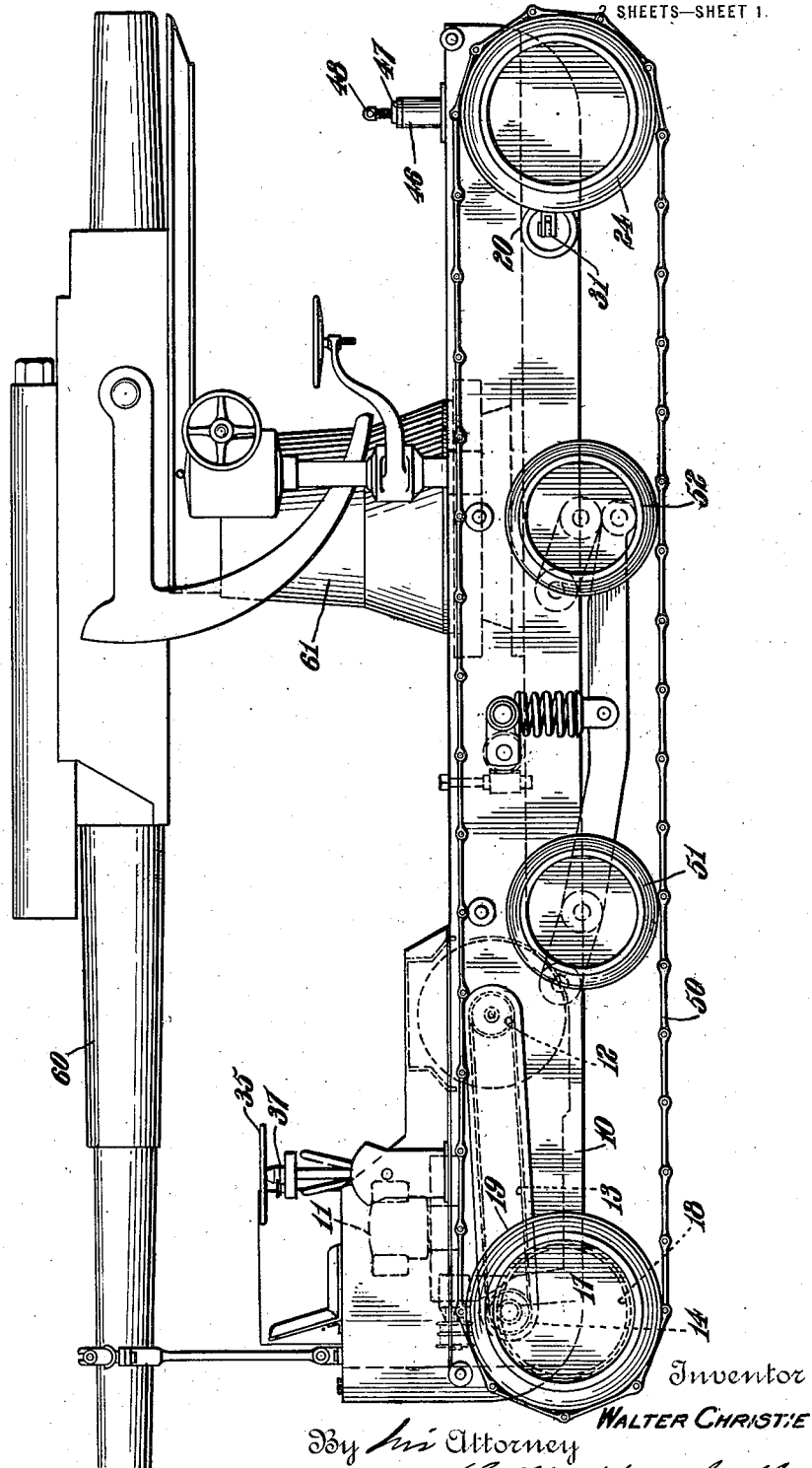

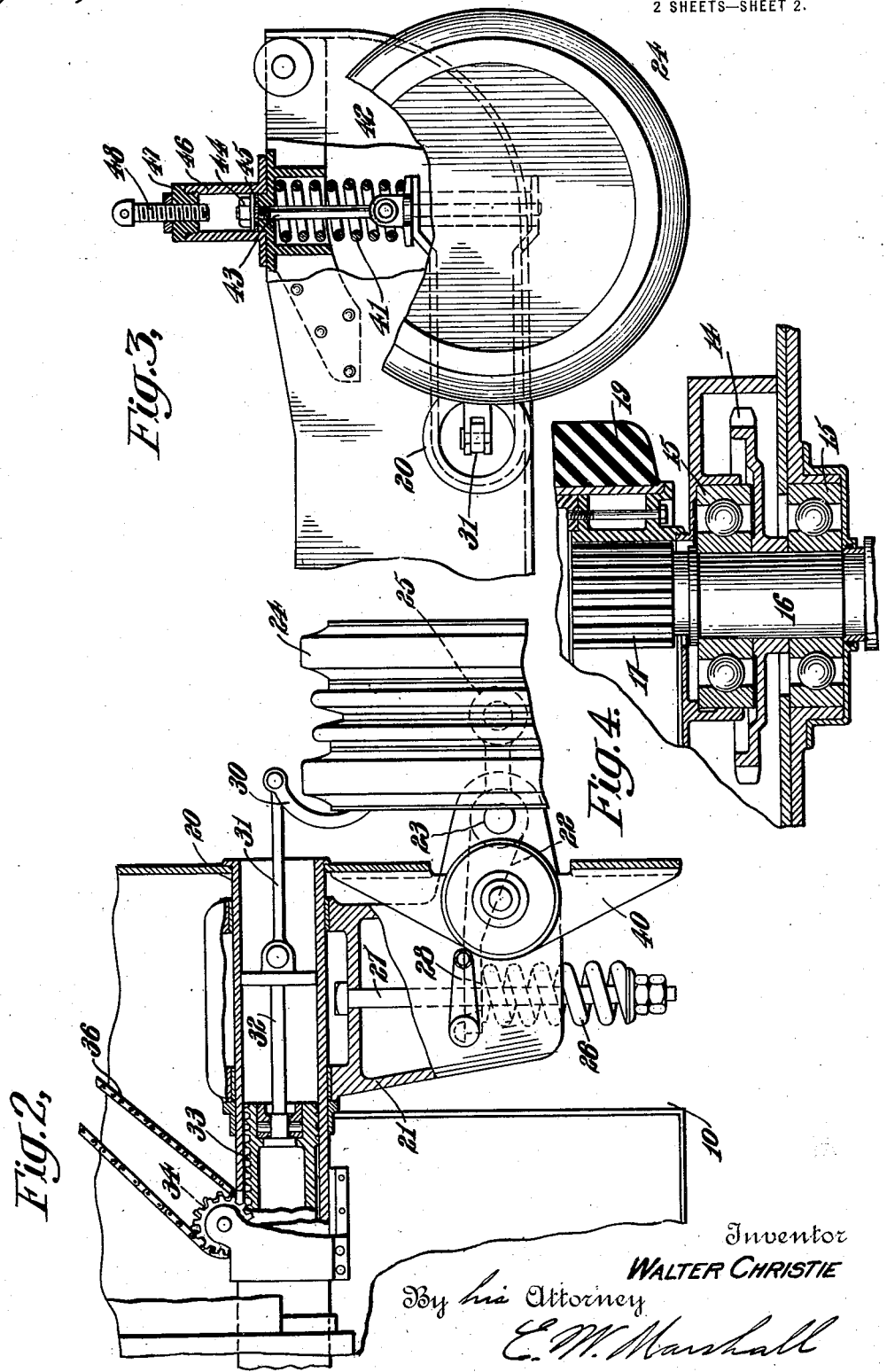

WALTER CHRISTIE, OF WEEHAWKEN, NEW JERSEY.

AERIAL-GUN TRACTOR.

1,394,066. Specification of Letters Patent. Patented Oct. 18, 1921.

Application filed March 2, 1920. Serial No. 362,804.

*To all whom it may concern:*

Be it known that I, WALTER CHRISTIE, a citizen of the United States of America, and a resident of Weehawken, county of Hudson, and State of New Jersey, have invented certain new and useful Improvements in Aerial-Gun Tractors, of which the following is a specification, reference being had to the accompanying drawings, forming a part thereof.

My invention relates to improvements in aerial gun tractors, and its object is to provide an improved motor-propelled mounting for aerial guns which may be run on vehicle wheels when used on roads or other comparatively smooth surfaces or upon tractor chains around the same wheels over rougher ground. More specifically, its object is to improve a driving mechanism for such apparatus and to provide supports for the steering wheels which have springs for absorbing shocks due to unevenness of the ground, which may be adjusted to rigidly oppose shocks from gun fire.

These and other objects of the invention will appear in the following specification in which I will describe the invention and the novel features of which will be set forth in appended claims.

Referring to the drawings:

Figure 1 is a side elevation of an apparatus which is made according to and embodies the present invention.

Fig. 2 is a plan view partly in section of the supporting mechanism for one of the steering wheels.

Fig. 3 is a side elevation partly in section of the mechanism shown in Fig. 2.

Fig. 4 is a sectional plan view of a detail of the driving wheel mechanism.

Like characters of reference designate corresponding parts in all the figures of the drawings.

10 designates the main frame of the apparatus. Near one end thereof is a transversely disposed engine 11. This through separate and independently controlled transmission mechanism is arranged to drive two sprockets 12, one on each side of the frame. Each driven sprocket is connected by a chain 13 with another sprocket 14 between bearings 15, 15 on an arbor 16 to which is affixed a pinion 17 in mesh with a bull-gear 18 on the driven vehicle wheel 19.

Near the other end of the frame is a transverse tube 20 on which are rotatively supported housings 21. 22 is a lever pivoted to the housing at 23. A wheel 24 is pivotally connected near one end of this lever at 25. 26 is a spring which is compressed between the other end of lever 22 and adjusting nuts on the end of a bolt 27. This tends to force the wheel 24 forward. The lever 22 may be locked against movement by an arm 28.

A bracket 30 projecting from a non-rotative part of the wheel is connected by a link 31 with a transversely slidable member 32 within the tube 20 which is connected with a rack 33 with which meshes a pinion 34 actuated from a steering wheel 35 by a chain 36. 37 is a locking device for the steering wheel. These parts are fully shown, described and claimed in my co-pending application for patent, Serial No. 315,777, filed August 6, 1919.

40 is a casting riveted to the frame 10 and forms a cup-shaped receptacle for a spring 41, the lower end of which bears against a collar 42 which has ears to which a rod 43 is connected. This passes through a clearance hole in the casting 40 above which is seated a nut 44 on a rubber washer 45. This limits the downward movement of the collar 42. The housing 21 rests on this collar.

A housing 46 affixed to the casting 40 supports a nut 47 through which runs a threaded member 48 which limits the upward movement of the collar 42, and which may be screwed down onto the rod 43 to prevent any upward movement of the housing 21. This arrangement is for the purpose of making a resilient connection between the wheels 24 and the frame 10, and providing means for eliminating this resiliency when desired. For example, when the tractor is used to support a gun, the members 48 are screwed down when the gun is to be fired in order to stabilize its mounting.

Tractor chains 50 may be placed around the wheels 19 and 24 and under intermediate wheels 51, 52 which are supported in substantially the same manner as are the intermediate wheels shown in the aforesaid application, Serial No. 315,777.

When the tractor chains are used the steering wheel 35 is locked and the levers 22 unlocked. These chains may be removed and the apparatus run with its wheels in contact with the ground. In the latter condition, the steering gear is unlocked and the levers 22 locked.

In either case the resilient connection between the frame 10 and the wheels 24 may be made inoperative by screwing down the members 48. This is desirable whenever stabilization or rigidity of support of the frame 10 is required. One case of this kind is when the tractor is used to support a gun, and in the specific embodiment herein shown a gun or rifle 60 is shown with its mount 61 of the type used for high elevations as for antiaircraft ordnance. The frame is long on account of the length of the rifle it supports and the type of drive shown is especially desirable for tractors of such long wheel base.

Obviously the invention herein shown and described is capable of being used for many purposes and is not limited to the specific use selected as an example. Therefore, I intend no limitations other than those imposed by the appended claims.

What I claim is:

1. In a tractor, the combination with the frame thereof and a wheel support comprising an arm movably mounted on the frame on a transversely extending axis, of a spring between the frame and arm, and an adjustable abutment for rendering the spring ineffective.

2. In a tractor, the combination with the frame thereof and a wheel support comprising an arm movably mounted on the frame on a transversely extending axis, of a spring between the frame and arm, a link connected to the arm and movable relatively to the frame, and a screw on the frame for engagement with the link for rendering the spring ineffective.

3. In a tractor, the combination with the frame thereof and a wheel support comprising an arm movably mounted on the frame on a transversely extending axis, of a spring between the frame and arm, a link connected to the arm, a housing on the frame into which said link projects, and a screw post at the top of said housing in the path of the link for locking the link against movement whereby movement of said arm is prevented.

4. In a tractor, the combination with the frame thereof and a wheel support comprising an arm movably mounted on the frame on a transversely extending axis, of a coil spring between the frame and arm, a link connected to the arm and passing through the spring, a housing on the frame into which said link projects, and a screw post at the top of said housing in the path of the link for locking the link against movement whereby movement of said arm is prevented.

5. A tractor comprising a frame, a swinging wheel support pivoted to the frame on a transverse axis, a transverse lever pivoted on the wheel support, a wheel near one end of said lever pivoted thereto on a vertical axis, lockable means for turning the wheel about said vertical axis, said wheel being arranged to engage a removable tractor chain, a compression spring arranged to press against the other end of the lever, and means for locking the lever against the action of said spring; combined with a compression spring between the wheel support and the frame and adjustable means for limiting the compression of the latter spring.

6. A tractor comprising a frame, an engine transversely supported thereon, sprocket wheels arranged to be driven by the engine, vehicle wheels on opposite sides of the frame, a bull-gear affixed to each of said vehicle wheels, a pinion for each bull-gear, shafts for said pinions supported on spaced bearings, a sprocket wheel on each pinion shaft between the spaced bearings, and chains between the pinion shaft sprockets and the engine driven sprockets.

In witness whereof, I have hereunto set my hand this 28 day of February, 1920.

WALTER CHRISTIE.

Witness:
M. BRUCKNER.